Sept. 12, 1961  E. GRONEMEYER ET AL  2,999,273
APPARATUS FOR MOLDING HOLLOW PLASTIC ARTICLES
Filed March 2, 1955  2 Sheets-Sheet 1
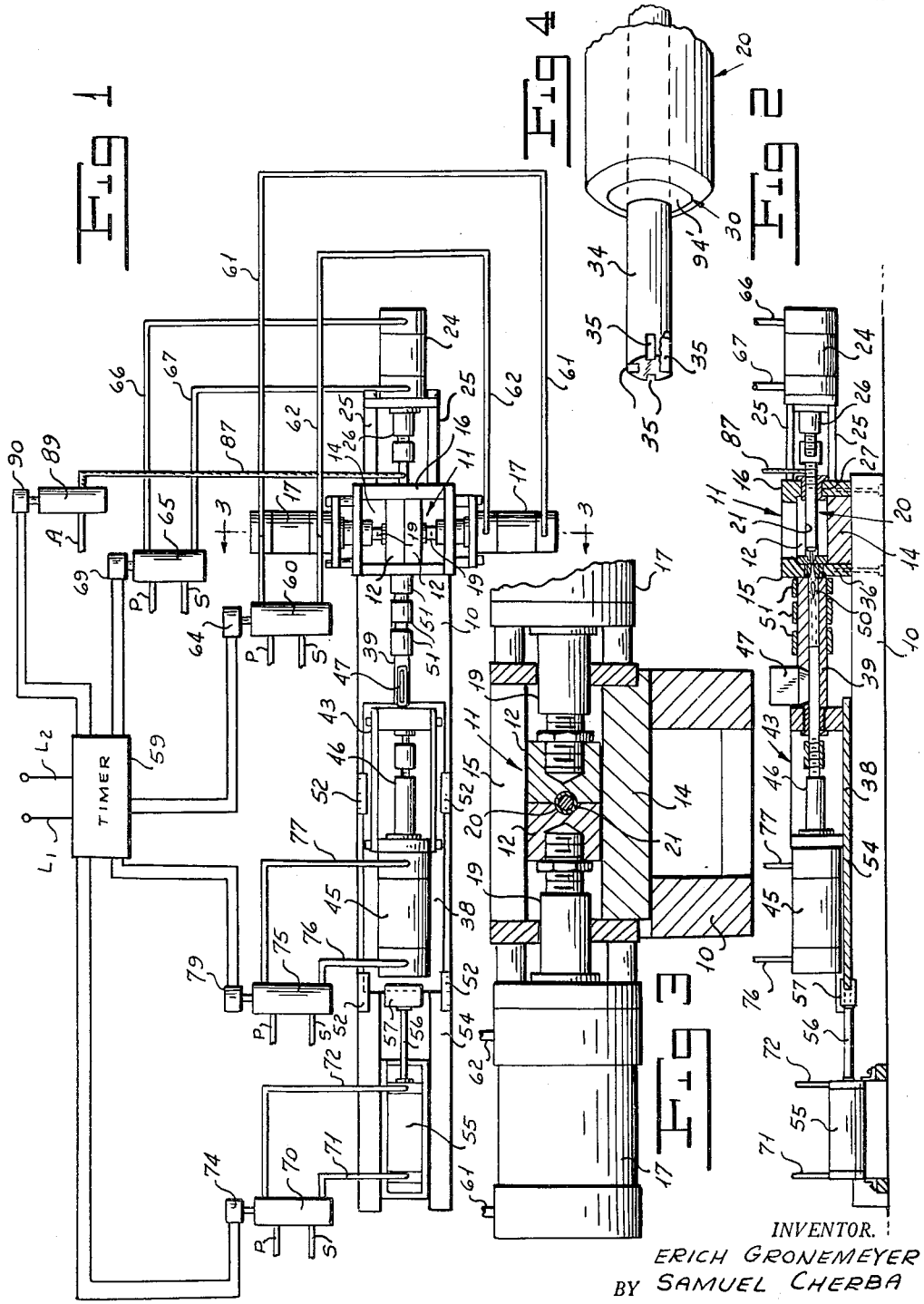
INVENTOR.
ERICH GRONEMEYER
BY SAMUEL CHERBA
Alfred W. Vibber
ATTORNEY

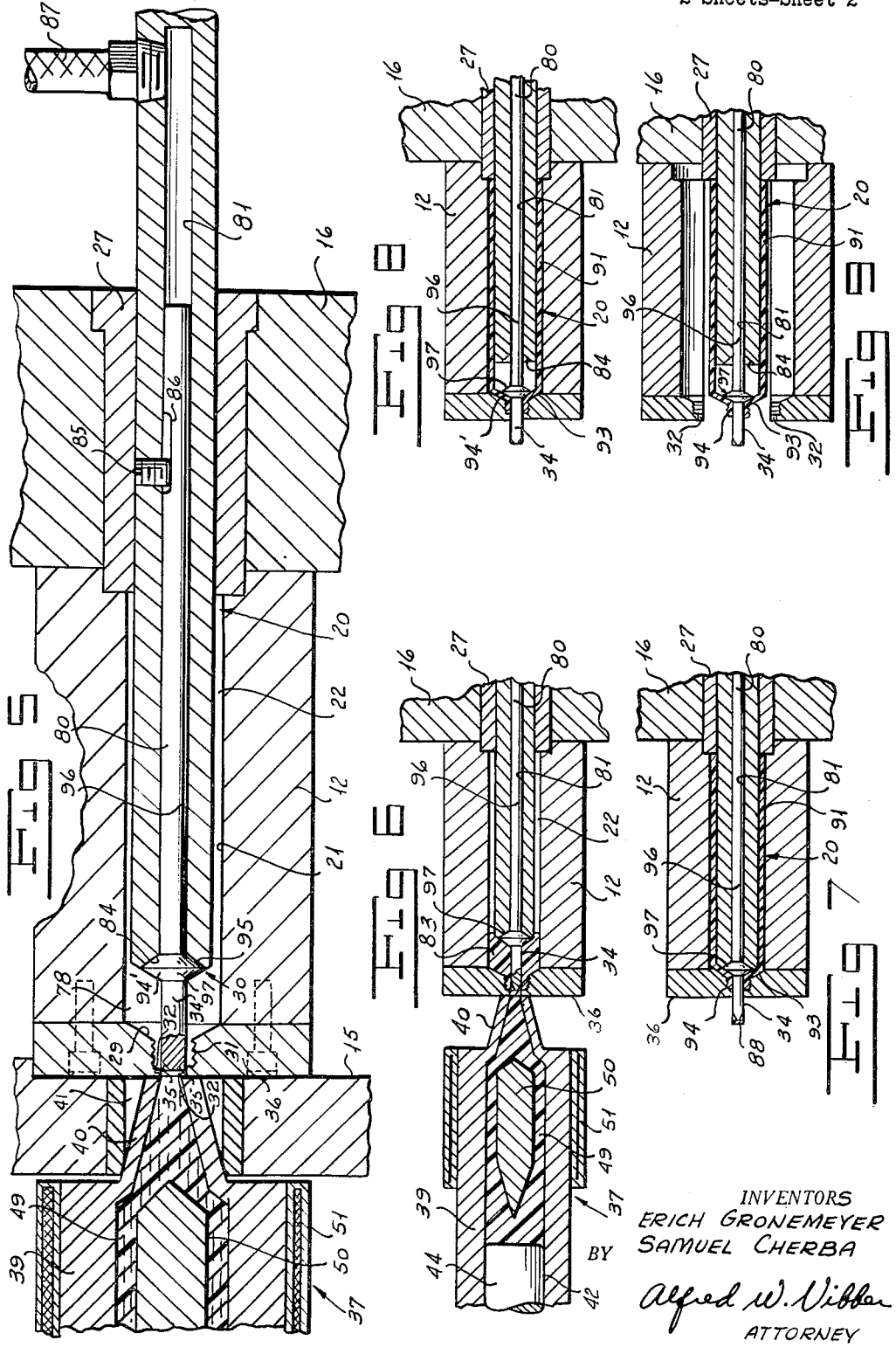

United States Patent Office 2,999,273
Patented Sept. 12, 1961

2,999,273
APPARATUS FOR MOLDING HOLLOW PLASTIC ARTICLES
Erich Gronemeyer, Pompton Plains, and Samuel Cherba, Totowa, N.J., assignors to Peerless Tube Company, Bloomfield, N.J., a corporation of New Jersey
Filed Mar. 2, 1955, Ser. No. 491,727
6 Claims. (Cl. 18—30)

This invention relates to a method of and an apparatus for molding hollow plastic articles. Typical of such articles are plastic collapsible containers of the dispensing tube type.

The present invention will be discussed primarily in connection with the making of collapsible dispensing tubes. It will be understood that the invention is not limited thereto, since various hollow articles may be made to advantage in accordance with the invention. Collapsible dispensing tubes, which are widely used for tooth paste, shaving cream, and the like, have in the past been made most frequently of metals, such as zinc, tin, and aluminum. Such material has been relatively expensive, and the machinery to produce the metal tubes has likewise been expensive, so that in many instances the cost of the collapsible tube has exceeded the cost of the contents.

It has previously been proposed to make such collapsible dispensing tubes of plastic material. In some of such previous proposals, the collapsible tube is made in two parts, the apertured top portion of the container being made initially separate from the sidewall portion and the two parts then being joined, or the sidewall portion then being formed as by molding or extrusion so as to be joined to the apertured top portion of the container. It will be appreciated that such procedure is complicated, and requires fairly complicated mechanism. In addition, there is always the possibility that there will be faulty joining of the top and sidewall portions of the container.

In other proposed methods of forming plastic collapsible containers, the apertured end of the container is first injection molded, after which the sidewall portion of the container is formed by continuously moving the mold part and core past the injection orifice. The mechanism necessary to practice such method is bulky, complicated, and difficult to control. The method requires close correlation between the speed of extrusion of the plastic material, the condition of the plastic material, and the speed of retreat of the mold and core relative to the injection orifice to produce a satisfactory container sidewall. Any appreciable change from the desired predetermined value of any of these features will result in the production of an inferior tube, variation in the condition of the plastic material from zone to zone of the container sidewall produces non-uniformity therein, and the method is particularly prone to difficulty since any entrained air in the plastic material tends to produce holes in the container sidewall.

The method and apparatus of our invention produces a one-piece hollow plastic article such as a collapsible dispensing container by relatively simple, easily controlled steps and mechanism. The plastic material which forms both the upper apertured portion of the container and the side wall portion thereof is thoroughly worked and is highly compressed twice in a short interval of time, thereby insuring uniformity of the plastic material and its freedom from air bubbles. Briefly, in accordance with the invention the plastic material which forms the upper apertured portion of the container is initially transfer molded, along with an excess charge sufficient to form the container sidewall. Almost immediately thereafter the molded apertured portion and the excess charge are further compressed to thrust the plastic material still more strongly into the part of the mold cavity forming the apertured neck of the container and to cause the excess charge to flow into the space between the cavity and a central core to mold the container sidewall. The mechanism of the invention is characterized by the ease with which it is controlled and the uniformity of the hollow articles produced thereby, both as regards their dimensions and the properties of the plastic material of which they are made. The apparatus is further characterized by the speed with which the hollow articles such as containers are made and removed from the mold, and by production of a tube which is completely finished and ready for filling and closing.

The invention has among its objects the provision of an improved method of and an apparatus for producing a one-piece hollow plastic article, for producing, in one preferred embodiment of the invention, a one-piece plastic collapsible dispensing tubular container, and the provision of such method and apparatus whereby a charge of plastic material to form the integral hollow plastic article is worked and compressed twice in rapid succession generally in reverse directions, thereby insuring uniformity of the plastic material and the substantial elimination of air bubbles.

Further objects of the invention reside in the provision of a method and apparatus for forming a one-piece hollow plastic article such as a collapsible dispensing container wherein the apertured portion of the container and sufficient excess plastic material to form the sidewall of the container are first transferred into a mold in one direction, and immediately thereafter the transferred plastic material is subjected to pressure in the reverse direction to reversely mold the sidewall of the container integral with the aperture-forming portion thereof, the provision of an automatic control system for apparatus of the above described type whereby the apparatus automatically and in that order transfer molds plastic material, reversely molds the transferred plastic material, and separates the container from the mold, and the provision of a mold for hollow articles such as collapsible tubes wherein the central core is centered at both ends at all times, one end of the mold being selectively open and closed, in the preferred embodiment of the mold the closing of its end after the transfer molding step also serving to cut off the molded gate or sprue.

Further objects and objects relating to details and economies of construction, operation, and use will more definitely appear from the detailed description to follow:

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIG. 1 is a somewhat diagrammatic view in plan of a preferred embodiment of molding apparatus in accordance with the invention, the apparatus producing a collapsible tube.

FIG. 2 is a view in side elevation of the apparatus of FIG. 1, the valve, portions of the fluid lines, and the controlling mechanism being omitted in this figure, portions of the transfer molding device and of the mold being shown in longitudinal vertical section.

FIG. 3 is a view in transverse vertical section through the apparatus, the section being taken along the line 3—3 of FIG. 1.

FIG. 4 is a fragmentary view in perspective of the forward, free, end of the core, a portion of the smaller end of the core being broken away.

FIGS. 5–9, inclusive, are somewhat simplified fragmentary views in axial section through the mold and core of the apparatus of the invention showing the relative position of the parts of the mold in each of five sequential steps of the method. In FIGS. 5 and 6 the nozzle end of the transfer device then cooperating with the mold is also shown in axial section. In FIGS. 6–9, inclusive, the front mold plate 15, and in FIGS. 7, 8, and 9 the nozzle 40, are omitted.

The molding apparatus of the embodiment shown is disposed horizontally on an elongated base 10. To the right-hand end of the base as it is shown in FIGS. 1 and 2, there is secured the mold structure generally designated 11. The mold structure comprises two mold halves 12, movable toward and away from each other, which, when the mold is closed, meet along a longitudinal vertical interface. The mold halves 12, as more clearly shown in FIGS. 2 and 3, are supported on the horizontal plate 14 and slide between the guideway-providing parallel front and rear mold plates 15 and 16, respectively. Each mold half 12 is selectively moved laterally as described by its respective hydraulic cylinder 17, the piston rod 19 of which is connected to the respective mold half. For the sake of simplicity of illustration temperature controlling jackets in the mold halves, with which they are preferably provided, are omitted.

An elongated circular cylindrical core 20 is positioned within the mold coaxial with the circular cylindrical horizontal cavity 21 provided between two mating mold halves. The core is of somewhat smaller diameter than the mold cavity so as to provide an annular container wall-defining space 22 (FIGS. 5 and 6) between the mold cavity and the core. The core is reciprocable longitudinally of the mold cavity between positions in which it is fully advanced into the cavity (FIG. 7) and is partially retracted therefrom (FIGS. 5 and 6). Such reciprocation of the core is effected by the hydraulic cylinder 24 attached to the mold plate 16 by the bolt and tubular spacing element 25, as shown. The piston rod 26 is connected to the rear end of the core. The core 20 slides within the bushing 27 which extends through the rear mold plate 16, bushing 27 holding the rear end of the core accurately centered with respect to the mold cavity.

The front end of the mold, through which it is charged by the transfer molding device to be described, is formed by a removable end plate 36 (see FIG. 5) on each mold half 12. When the two mold halves and thus the plates 36 are in mating confronting relationship, the plates 36 define a frusto-conical extension 29 of the cylindrical cavity in the mold halves 12, an interiorly threaded, generally cylindrical neck-forming portion 31 outwardly of the frusto-conical portion, and a reduced diameter, smooth cylindrical bore 32 outwardly of the threaded portion. The forward end of the core 20 is provided with a frusto-conical surface 30 parallel to the surface 29 of the mold cavity. Beyond surface 30 core 20 is provided with a central circular cylindrical pilot pin 34 of reduced diameter, which snugly and sealingly reciprocates in the bore 32. The outer, forward end of pilot pin 34 is provided with a plurality (four shown) of angularly spaced slots 35 which slope inwardly toward the axis of the pin in a forward direction. For reasons more apparent hereinafter, the slots 35 are of such length longitudinally of the core that when the core is retracted as shown in FIGS. 5 and 6 the inner ends of the slots lie somewhat inwardly of the inner end of the bore 32, and that when the core is fully advanced into the mold as shown in FIG. 7 the inner ends of the slots 35 lie outwardly of the inner end of the bore 32.

Cooperating with the mold 11 is the plastic material transfer device generally designated 37. This device, which is supported on the plate 38 which in turn slides on the base 10, comprises a transfer cylinder 39, connected at its front end to plate 38 by frame 43, and positioned coaxially of the mold cavity. At the rear, delivery end of the transfer cylinder 39 there is the rearwardly tapered nozzle 40 which is centered and guided by the opening 41 in mold plate 15 when the transfer cylinder confronts the mold as shown in FIG. 2. Transfer cylinder 39 is provided with a central bore 42 in which there is located the reciprocable plastic material transfer plunger 44. Plunger 44 is operated by the hydraulic cylinder 45, the outer end of piston rod 46 of which is connected to the end of the plunger. Plastic material is fed into cylinder 39 through the feed hopper 47. The cylinder 39 is heated by the electric resistance band heaters 51. Near the delivery end of bore 42 the transfer cylinder is provided with the "torpedo" 50. As the plastic material 49 is thrust in the direction of the mold upon repeated feeding strokes of the plunger 44 it is progressively heated, plasticized, and compacted so that it is delivered to the mold in substantially uniformly optimumly plasticized condition. Typical of plastic materials employed in the practice of the invention are "Vinylite" and polyethylene.

In the apparatus of the invention the transfer device is presented to the mold during the mold charging operation and then is removed therefrom to permit subsequent operations of the mold, including the removal of the molded container from the mold. The plate 38 which supports the transfer device is guided for longitudinal travel on the upper surface 54 of the base 10 by the plate edge guiding members 52 shown in FIG. 1. Plate 38, and thus the transfer device, are advanced to and retracted from the mold by the hydraulic cylinder 55, the piston rod 56 of which is connected to the plate 38 by the connecting device 57.

The various elements of the apparatus are controlled to move in the sequence more particularly to be described in connection with FIGS. 5–9, inclusive, by the control mechanism indicated in FIG. 1. In this embodiment a conventional electrically actuated sequence timer 59, supplied by the electric power source $L_1$, $L_2$ is employed to operate solenoid actuated valves controlling the various hydraulic cylinders. The two mold half-controlling hydraulic cylinders 17, which are connected in parallel as shown, are under the control of the sequence timer 59 and the conventional reversing valve 60, actuated by solenoid 64. Valve 60 is supplied with a source of fluid under pressure through pipe P, and selectively delivers such fluid to the outer ends of cylinders 17 through the pipe 61 to move the mold halves into closed, mating position, and delivers the fluid through pipe 62 to the inner ends of such cylinders to open the mold. Discharge of fluid from the cylinders takes place through valve 60 and to a sump (not shown) through pipe S. The core reciprocating cylinder 24 is controlled by the conventional reversing valve 65 provided with the actuating solenoid 69. Fluid under pressure from pipe P is selectively delivered through valve 65 to pipe 66 and thence to the outer end of cylinder 24 to advance the core into the mold, and is delivered to the inner end of the cylinder 24 through pipe 67 to partially retract the core 20 from the mold.

The cylinder 55, for presenting the transfer device to and retracting it from the mold, is under the control of valve 70. When the valve is shifted in one direction by the actuating solenoid 74 it delivers fluid under pressure to pipe 71 to advance the transfer device into cooperation with the mold, and when flow of fluid through the valve is reversed, fluid under pressure flows into cylinder 55 through pipe 72 to retract the transfer device from the mold. The transfer plunger actuating cylinder 45 is controlled in a similar manner by the valve 75 actuated by solenoid 79, the admission of fluid under pressure through pipe 76 serving to drive plunger 44 in a plastic material feeding direction and the admission of fluid under pressure to pipe 77 causing retraction of the plunger 44.

FIG. 5 shows the relative position of the parts of the mold and transfer device at the start of a container-molding cycle. In this, the first position, cylinder 24 has been actuated to retract the core 20 sufficiently to provide a plastic material receiving cavity 78 of predetermined desired volume between the free end of the core and the confronting portion of the mold cavity. In this position of the core, as above noted, communication is provided between the outer end of the bore 32 and the cavity 78. In such first position the transfer device confronts the mold in plastic material delivering position. Thereupon the cylinder 45 is operated to thrust plunger 44 to feed plastic material 49 into the cavity 78 of the mold to form the transferred charge 83 (FIG. 6). Such transfer of the plastic material, which takes place under high pressure, additionally plasticizes the plastic material by reason of its flow through the narrow slots 35, and causes the charge to fill the cavity and the outer portion thereof to conform to the threaded portion 31 of the cavity.

After the transfer step of FIG. 6, cylinder 55 is substantially immediately operated to retract the transfer device from the mold, and almost immediately after retraction of the transfer device the cylinder 24 is operated to advance the core 20 fully into the mold cavity (FIG. 7). Such advance of the core serves, after a short travel thereof, to close the delivery end of the mold when the inner ends of the slots 35 have travelled beyond the inner end of the smooth bore 32. At the same time the gate or sprue portion 88 is sheared off by the outer end of the pilot pin 34 on the core. Portion 88 may be removed from pin 34 by hand. Continued advance of the core into the mold, with the consequent progressive decrease of the volume of cavity 78, subjects the charge 83 to very high pressure and causes the plastic material 83 to be reversely molded between the core and the mold cavity to form the container sidewall 91, and still further compresses and molds the frusto-conical shoulder portion 93 and the threaded neck portion 94 of the container. The core is shown in FIG. 7 in its fully advanced position, after it has completed the backward molding of the container sidewall 91.

After the core has completed such advance, the valve 65 operates to cause the cylinder 24 to retract the core to the position shown in FIG. 8. During such retraction, the molded container remains in place in the still closed mold, the friction between the molded container and the wall of the mold cavity, plus the thrust on the bottom end of the container sidewall by the inner end of the bushing 27 retaining the container from travel with the core. The partial retraction of the core serves to loosen the container sidewall therefrom and to facilitate subsequent removal of the container.

Thereupon the valve 60 operates to cause the cylinder 17 to separate the mold halves 12, as indicated in FIG. 9. Removal of the container from the core is effected by air ejecting means which is actuated after the separation of the mold halves. As shown most clearly in FIGS. 5-9, inclusive, the core 20 is provided with a center bore 81 in which there is mounted for limited longitudinal reciprocation with respect thereto the stem 80 of a valve device. Stem 80 has one or more longitudinal slots 96 therein extending from its rear end to immediately adjacent its enlarged head. The outer end of such valve device, which has the previously described pilot pin 34 mounted thereon, is in the nature of a mushroom valve having an enlarged head 97, the outer frusto-conical surface 94' of which forms a portion of the frusto-conical core surface 30, and the inner frusto-conical surface 95 of which sealingly fits within the seat 84 at the end of the outer portion of the bore 20. A stud 85 projects inwardly from the outer part of the core 20 into the slot 86 in the stem 80 of the ejector pin, so as to limit travel of the pin with respect to the outer member of the core.

The outer end of the bore 81 is selectively supplied with compressed air through the flexible conduit 87 which extends to the solenoid operated shut-off valve 89. When energized by the sequence timer 59, the solenoid 90 opens valve 89 to permit the flow of compressed air from source A through the valve 89 and to the bore 81 in the core, and when de-energized by the sequence timer such solenoid functions to close valve 89 to shut off the air supply to the core.

When the core is retracted into the position shown in FIG. 8, after the molding of a tube, the frictional engagement between the inner surface of neck 94 of the tube and the pilot pin 34 of the valve member causes the valve member to remain in its outermost position. When compressed air is then introduced into bore 81 of the core as described, such air travels through the one or more slots 96 longitudinally of stem 80 of the valve member and escapes into the space between the free end of the outer portion of the core 20 and the inner surface of the shoulder of the molded tube. The tube is thereupon blown off the core through the hole 41 in mold plate 15 in the direction to the left in FIG. 9.

The valve member is automatically returned to the position shown in FIG. 5 when the air supply to bore 81 of core 20 is shut off by valve 89 following ejection of the tube, and after the transfer device has again been presented to the mold as indicated in FIG. 5. The outer end of nozzle 40 of the transfer cylinder returns the pilot pin 34 to a position in which its outer end lies flush with the outer end of the mold. At the start of transfer of plastic material into the mold, the transferred material thrusts pin 34 backwardly and inwardly to complete the seating of the mushroom head 97 of the valve member in the seat 84 in the outer portion of core 20.

Whereas for purposes of illustration we have shown and described embodiments of the method of and apparatus for molding plastic collapsible containers, it is to be understood that such embodiments are illustrative only and that the invention is capable of variations as to details of both the method and apparatus. Thus, for example, the molded container may have its apertured neck offset from the axis of the container, if desired. Further, the sidewall of the container need not be of circular cylindrical shape, as shown, but can be of any desired shape uniform in cross section. Also, the invention may be practiced to advantage in the forming of hollow plastic articles other than containers. The invention is, therefore, to be defined by the scope of the claims appended hereto.

We claim:

1. Apparatus for forming tubular plastic containers, which comprises: a mold having an elongated cavity therein, an elongated reciprocable core positioned in the mold cavity, said core having a diameter less than that of the mold cavity and, with the mold cavity, forming a container sidewall-defining space, the core having a free end located adjacent a first end of the mold cavity, the core being partially retractable to produce a charge-receiving space in the mold communicating with the sidewall-defining space, a passage in the first end of the mold centrally confronting the free end of the core, the core having a central pin on its free end which closes the passage when the core is advanced into the mold and provides an opening through the passage when the core is partially retracted, and means for alternatly partially retracting the core from the mold and for advancing the core into the mold to close the passage and to compress the charge of plastic material in the charge-receiving space to force such plastic material to flow into the container sidewall-defining space.

2. Apparatus for forming tubular plastic articles, which comprises: a mold having an elongated cavity therein, an elongated core positioned in the mold cavity, said core being reciprocable between a position in which it is fully advanced into the mold and one in which it is partially retracted from the mold, having a diameter less than that of the mold cavity and, with the mold cavity, forming an article sidewall-defining space, the core having a free end located adjacent a first end of the mold cavity, the core when partially retracted producing a charge-receiving space in the mold communicating with the sidewall-defining space, a passage in the first end of the mold centrally confronting the free end of the core, the core having a pin on its free end which snugly fits within the passage to center the free end of the core at all times, the outer end of the pin having at least one flute extending from the tip of the pin and into communication with the charge-receiving space when the core is partially retracted, the flute lying wholly within the passage when the core is appreciably advanced into the mold, and means for alternately partially retracting the core from the mold and for advancing the core into the mold to close the passage and to compress the charge of plastic material in the charge-receiving space to force such plastic material to flow into the article sidewall-defining space.

3. In the apparatus set forth in claim 2, the pin on the core being centrally located on the core and being of markedly smaller diameter than the core.

4. In the apparatus set forth in claim 3, the mold cavity and core being cylindrical.

5. Apparatus for forming collapsible tubular plastic dispensing containers, which comprises: a longitudinally divided multi-part mold, said mold having an elongated closed cavity therein, an elongated reciprocable core positioned in the mold cavity, said core having a cross section smaller than that of the mold cavity and, with the mold cavity, forming a container sidewall-defining space, the core having a free end located adjacent one end of the cavity, the core being partially retractible to produce a charge-receiving space in the mold communicating with the sidewall-defining space, a passage in the mold communicating with the charge-receiving space, a plastic material transfer device for introducing plastic material under pressure into said passage and thus to the charge-receiving space so as to fill the charge-receiving space with plastic material under material-molding pressure, said device having a plastic material delivering nozzle, means mounting the nozzle for movement toward and away from the mold so as to be connected to and spaced from the outer end of the passage in the mold, respectively, means for selectively moving the parts of the mold together into cooperation with the core and away from the core, respectively, means for closing the passage when the core is advanced into the mold, means for alternately partially retracting the core from the mold to open the passage and to form the charge-receiving space and for advancing the core into the mold to close the passage and to compress the charge of plastic material in the charge-receiving space to force such plastic material to flow into the container sidewall-defining space, and means controlling the machine for causing the sequential operation of the parts of the apparatus in the following cycle: closing the mold and retracting the core, transferring the plastic material into the charge-receiving space, advancing the core, retracting the core, and opening the mold.

6. Apparatus for forming collapsible tubular plastic dispensing containers, which comprises: a longitudinally divided multi-part mold, said mold having an elongated cylindrical closed cavity therein, an elongated reciprocable cylindrical core positioned in the mold cavity, said core having a diameter less than that of the mold cavity and, with the mold cavity, forming a container sidewall-defining space, the core having a free end located adjacent one end of the cavity, the core being partially retractible to produce a charge-receiving space in the mold communicating with the sidewall-defining space, a passage in the mold communicating with the charge-receiving space, a plastic material transfer device for introducing plastic material under pressure into said passage and thus to the charge-receiving space so as to fill the charge-receiving space with plastic material under material-molding pressure, said device having a plastic material heating, compressing, and delivering cylinder, means mounting the cylinder for movement toward and away from the mold so as to be connected to and spaced from the outer end of the passage in the mold, respectively, means for selectively moving the parts of the mold together into cooperation with the core and away from the core, respectively, means for closing the passage when the core is advanced into the mold, means for alternately partially retracting the core from the mold to open the passage and to form the charge-receiving space and for advancing the core into the mold to close the passage and to compress the charge of plastic material in the charge-receiving space to force such plastic material to flow into the container sidewall-defining space, and means controlling the machine for causing the sequential operation of the parts of the apparatus in the following cycle: closing the mold and retracting the core, advancing the transfer cylinder into communication with the passage in the mold, transferring the plastic material into the charge-receiving space, retracting the transfer cylinder from the mold, advancing the core, retracting the core, and opening the mold.

References Cited in the file of this patent

UNITED STATES PATENTS

| | | |
|---|---|---|
| 1,754,496 | Barker | Apr. 15, 1930 |
| 1,782,360 | Lynch | Nov. 18, 1930 |
| 1,826,945 | McKay et al. | Oct. 13, 1931 |
| 2,471,148 | Gale et al. | May 24, 1949 |
| 2,487,703 | Gougler | Nov. 8, 1949 |
| 2,582,260 | Kutik | Jan. 15, 1952 |